H. K. AVERILL.
Thrashing Machine.
No. 92,245.        Patented July 6, 1869.
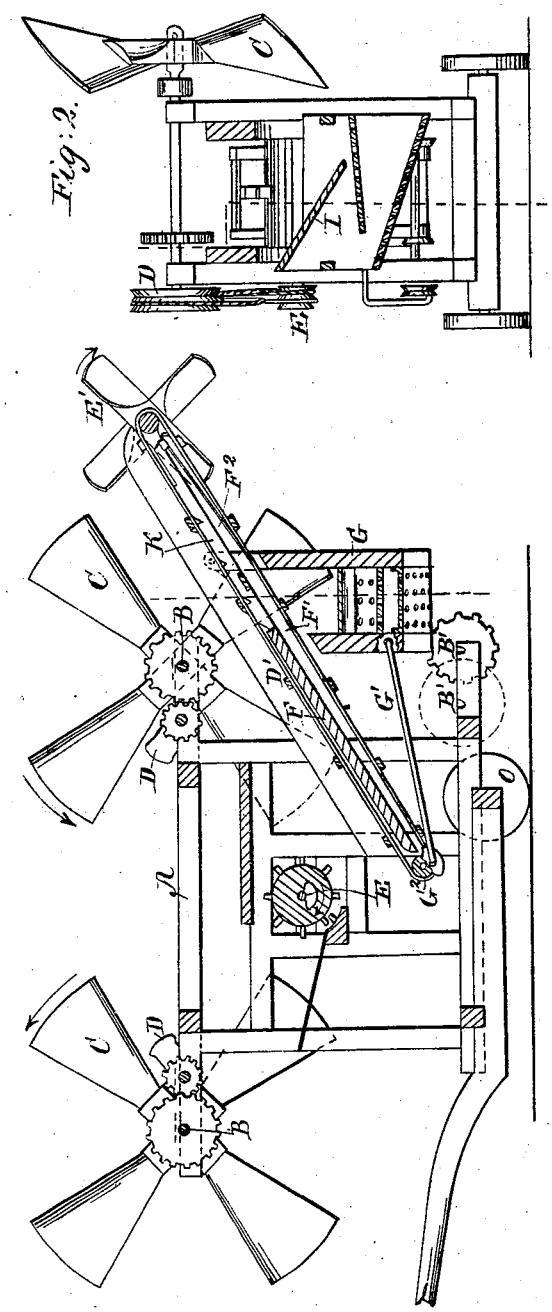
Witnesses
Inventor
H. K. Averill

UNITED STATES PATENT OFFICE.

HENRY K. AVERILL, OF NEW OREGON, IOWA.

IMPROVEMENT IN THRASHING-MACHINES.

Specification forming part of Letters Patent No. 92,245, dated July 6, 1869.

*To all whom it may concern:*

Be it known that I, H. K. AVERILL, of New Oregon, in the county of Howard and State of Iowa, have invented a new and useful Improvement in Thrashing-Machines; and I do hereby declare that the following is a full, clear, and exact description thereof, which will enable others skilled in the art to make and use the same, reference being had to the accompanying drawing, forming part of this specification.

This invention relates to improvements in portable grain-thrashing machines, whereby they are adapted to be operated by either wind or horse power, or both combined, as will be hereinafter more fully described.

Also, to provide a straw, chaff, and grain-carrier and separating apparatus of improved construction, adapted for cleaning the grain ready for market without the employment of fans, by the action of the wind.

Also to provide certain other details of improvement, as will be hereinafter specified.

Figure 1 represents a longitudinal sectional elevation of my improved machine, and Fig. 2 represents a transverse section of the same.

Similar letters of reference indicate corresponding parts.

A represents the framing, which may be of any preferred construction, and whereon, at the top, I provide one or more driving-shafts, B, fitted at one end with wind-wheels, C, which shafts gear with pulleys D, belting onto the cylinder-pulley E. Any preferred number of these wind-wheels may be employed, but I prefer to use two for ordinary machines, as I find, by practice, that they are sufficient to produce the required amount of power without requiring to be too large for convenience in handling, to attach or remove them from their shafts or for transporting the machine. The ends of the shafts whereon the said wheels are placed are suitably formed for the attachment of the tumbling-shafts of horse-powers, and the latter may be applied to work the machine when the wind is not strong enough, or as an auxiliary power; and to render the said application more convenient, one of the shafts, B, with its pulley, D, may be removed from the top and placed in bearings at the bottom of the frame, as represented at B'.

D' represents my improved grain and straw carrier, which I also propose to so arrange that it may be driven by a wind-wheel, E'.

The said carrier D' moves over a close bottom, F, to the point F¹, where an opening is made for the grain to drop into the winnowing device G, composed of two side walls and two or more inclined shelves, H, perforated and having their inclinations opposed to each other. Above the said shelves an inclined slide, I, is arranged to regulate the delivery of the grain to the windward of the separator, and the amount of wind admitted to the said winnowing apparatus and other movable slides may be applied to the winnower to regulate the blast. Above the said winnowing apparatus another closed bottom, F², is arranged to carry back any grain which may be carried in the straw too far to fall into the shelves H.

A bar, K, having a series of inclined planes and ledges, is arranged under the carrier D, near the top, to impart a shaking motion to the said carrier to facilitate the separation of the grain.

The machine is arranged with the side to the wind which affords the best application of the wind to the wheels, and also to the winnowing device, and the chaff and other light and short matter falling from the carrier with the grain are thereby carried away, and the grain cleaned by a much cheaper and simpler process than when fans are employed. When it is required to stop the machine, it may be turned from the wind on the truck-wheels O, provided for that purpose.

The lower end of the carrier is designed to be so arranged that it may be raised to lower the outer end for the application or removal of the wind-wheel.

This machine is not designed for operation when there is not sufficient wind to operate the carrier and separator, which, however, require but little, but the carrier may, if preferred, be operated from one of the pulleys B.

The winnowing device G may be suspended from the frame of the carrier and vibrated by a rod, $G^1$, deriving motion from the roller $G^2$ at the bottom of the carrier.

Having thus described my invention, I claim as new and desire to secure by Letters Patent—

1. So constructing the thrashing-machine that the cylinder and endless carrier are adapted to be driven either by the wind-wheels or a tumbling-rod and horse-power, or both combined, substantially as described, for the purpose specified.

2. The arrangement of the carrier D', closed bottoms F and $F^1$, and the shaking device K, all substantially as specified.

3. The combination, with the carrier, of the winnower G, constructed and arranged substantially as specified.

H. K. AVERILL.

Witnesses:
   D. B. BURKE,
   T. P. IVENS.